United States Patent
Croteau et al.

(10) Patent No.: US 11,203,947 B2
(45) Date of Patent: Dec. 21, 2021

(54) AIRFOIL HAVING INTERNALLY COOLED WALL WITH LINER AND SHELL

(71) Applicant: Raytheon Technologies Corporation, Farmington, CT (US)

(72) Inventors: Paul F. Croteau, Columbia, CT (US); John E. Holowczak, Windsor, CT (US); Thomas J. Martin, East Hampton, CT (US); Paul Attridge, Colchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 48 days.

(21) Appl. No.: 16/870,310

(22) Filed: May 8, 2020

(65) Prior Publication Data

US 2021/0348517 A1  Nov. 11, 2021

(51) Int. Cl.
*F01D 9/02* (2006.01)
*F01D 9/06* (2006.01)
*F01D 25/12* (2006.01)

(52) U.S. Cl.
CPC ............ *F01D 9/065* (2013.01); *F01D 9/02* (2013.01); *F01D 25/12* (2013.01); *F05D 2240/12* (2013.01); *F05D 2300/20* (2013.01)

(58) Field of Classification Search
CPC . F01D 9/02; F01D 9/065; F01D 25/12; F05D 2240/12; F05D 2300/20
See application file for complete search history.

(56) References Cited

U.S. PATENT DOCUMENTS

| | | | |
|---|---|---|---|
| 4,519,745 A | 5/1985 | Rosman et al. | |
| 5,484,258 A | 1/1996 | Isburgh | |
| 5,641,014 A * | 6/1997 | O'Connor | F01D 5/14 |
| | | | 164/516 |
| 6,451,416 B1 | 9/2002 | Holowczak et al. | |
| 6,696,144 B2 | 2/2004 | Holowczak et al. | |

(Continued)

FOREIGN PATENT DOCUMENTS

| | | |
|---|---|---|
| EP | 1420143 | 5/2004 |
| WO | 2006052278 | 5/2006 |

OTHER PUBLICATIONS

Holowczak, et al., "Hybrid Monolithic Ceramic/Ceramic Matrix Composites; from Turbine Airfoils to Armor", presented at the 35 Annual International Conference & Exposition on Advanced Ceramics & Composites (ICACC), Jan. 26, 2011, A. Cer. S., Daytona Beach, Fl., Jan. 2011.

*Primary Examiner* — Igor Kershteyn
(74) *Attorney, Agent, or Firm* — Carlson, Gaskey & Olds, P.C.

(57) ABSTRACT

An airfoil includes an airfoil section that has an airfoil wall that surrounds a cavity. The airfoil wall includes a first wall section comprised of a monolithic ceramic shell, a second wall section comprised of a CMC liner that is bonded along an interface to an interior side of the monolithic ceramic shell, and a ceramic barrier coating that is bonded to an exterior side of the monolithic ceramic shell. The airfoil wall includes at least one of: inter-section cooling channels that extend along the interface and are bounded by the monolithic ceramic shell and the CMC liner, or intra-section cooling channels that extend within the CMC liner.

19 Claims, 6 Drawing Sheets

(56) References Cited

U.S. PATENT DOCUMENTS

| | | | |
|---|---|---|---|
| 8,267,659 B2* | 9/2012 | Ahmad | F01D 5/182 |
| | | | 416/97 R |
| 9,387,533 B1* | 7/2016 | Heneveld | B22C 9/04 |
| 9,555,470 B1* | 1/2017 | Heneveld | F01D 5/147 |
| 10,507,518 B2 | 12/2019 | Merrill et al. | |
| 2003/0207155 A1* | 11/2003 | Morrison | C04B 35/80 |
| | | | 428/699 |
| 2008/0199661 A1 | 8/2008 | Keller et al. | |
| 2015/0251376 A1* | 9/2015 | Zhang | F01D 5/187 |
| | | | 428/166 |

* cited by examiner

AIRFOIL HAVING INTERNALLY COOLED WALL WITH LINER AND SHELL

STATEMENT REGARDING FEDERALLY SPONSORED RESEARCH OR DEVELOPMENT

This invention was made with government support under U.S. Government contract No. DE-FE0031622 awarded by the Department of Energy. The Government has certain rights in this invention.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

An airfoil according to an example of the present disclosure includes an airfoil section that has an airfoil wall surrounding a cavity. The airfoil wall includes a first wall section comprised of a monolithic ceramic shell, a second wall section comprised of a ceramic matrix composite (CMC) liner bonded along an interface to an interior side of the monolithic ceramic shell, and a ceramic barrier coating bonded to an exterior side of the monolithic ceramic shell. The airfoil wall includes at least one of: inter-section cooling channels extending along the interface and bounded by the monolithic ceramic shell and the CMC liner or intra-section cooling channels that extend within the CMC liner.

In a further embodiment of any of the foregoing embodiments, the monolithic ceramic shell has a first thermal conductivity and the CMC liner has a second thermal conductivity that is lower than the first thermal conductivity.

In a further embodiment of any of the foregoing embodiments, the monolithic ceramic shell is selected from the group consisting of SiC, Si3N4, Al2O3, SiAlON, nitrogen-bonded SIC, and AlN, and the CMC liner is SiC fiber/SiC matrix.

In a further embodiment of any of the foregoing embodiments, the airfoil wall includes the inter-section cooling channels.

In a further embodiment of any of the foregoing embodiments, the inter-section cooling channels are in a serpentine arrangement.

In a further embodiment of any of the foregoing embodiments, the inter-section cooling channels include flow guides.

In a further embodiment of any of the foregoing embodiments, the monolithic shell is comprised of first and second panels bonded along the interface with the CMC liner, the first and second panels meet at a joint, and the inter-section cooling channels open to an exit channel in the joint.

In a further embodiment of any of the foregoing embodiments, the airfoil wall includes the intra-section cooling channels.

In a further embodiment of any of the foregoing embodiments, the CMC liner includes first and second spaced-apart face layers, fibrous ligaments connecting the first and second spaced-apart face layers, and the intra-section cooling channels extend between the fibrous ligaments.

In a further embodiment of any of the foregoing embodiments, the fibrous ligaments form a pattern.

In a further embodiment of any of the foregoing embodiments, the intra-section cooling channels have a trapezoidal cross-section.

In a further embodiment of any of the foregoing embodiments, the monolithic shell is comprised of first and second panels bonded along the interface with the CMC liner, the first and second panels meet at a joint, and the intra-section cooling channels open to an exit channel in the joint.

An airfoil according to an example of the present disclosure includes an airfoil section that has an airfoil wall surrounding a cavity. The airfoil wall includes a first wall section comprised of a monolithic ceramic shell, a second wall section comprised of a ceramic matrix composite (CMC) liner bonded along an interface to an interior side of the monolithic ceramic shell, and a ceramic barrier coating bonded to an exterior side of the monolithic ceramic shell. The monolithic ceramic shell has a first thermal conductivity and the CMC liner has a second thermal conductivity that is lower than the first thermal conductivity. Cooling channels extend along the interface and are bounded by the monolithic ceramic shell and the CMC liner.

In a further embodiment of any of the foregoing embodiments, the monolithic shell is comprised of first and second panels bonded along the interface with the CMC liner, the first and second panels meet at a joint, and the cooling channels open to an exit channel in the joint.

In a further embodiment of any of the foregoing embodiments, the monolithic ceramic shell is selected from the group consisting of SiC, Si3N4, Al2O3, SiAlON, nitrogen-bonded SIC, and AlN, and the CMC liner is SiC fiber/SiC matrix.

A gas turbine engine according to an example of the present disclosure includes a compressor section, a combustor in fluid communication with the compressor section, and a turbine section in fluid communication with the combustor. The turbine section has an airfoil that includes an airfoil section having an airfoil wall surrounding a cavity. The airfoil wall includes a first wall section comprised of a monolithic ceramic shell, a second wall section comprised of a ceramic matrix composite (CMC) liner bonded along an interface to an interior side of the monolithic ceramic shell, and a ceramic barrier coating bonded to an exterior side of the monolithic ceramic shell. The airfoil wall has at least one of: inter-section cooling channels extending along the interface and bounded by the monolithic ceramic shell and the CMC liner or intra-section cooling channels that extend within the CMC liner.

In a further embodiment of any of the foregoing embodiments, the monolithic ceramic shell has a first thermal conductivity and the CMC liner has a second thermal conductivity that is lower than the first thermal conductivity.

In a further embodiment of any of the foregoing embodiments, the airfoil wall includes the inter-section cooling channels. The monolithic shell is comprised of first and second panels bonded along the interface with the CMC liner. The first and second panels meet at a joint, and the inter-section channels open to an exit channel in the joint.

In a further embodiment of any of the foregoing embodiments, the airfoil wall includes the intra-section cooling channels. The CMC liner includes first and second spaced-apart face layers and fibrous ligaments connecting the first and second spaced-apart face layers. The intra-section channels extend between the fibrous ligaments. The monolithic shell is comprised of first and second panels bonded along the interface with the CMC liner. The first and second panels meet at a joint, and the intra-section channels open to an exit channel in the joint.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
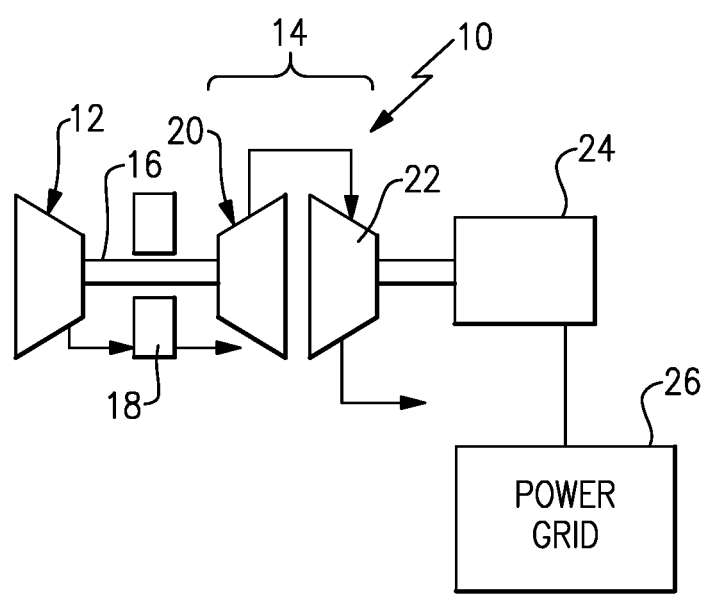
FIG. 1 illustrates an example gas turbine engine.

FIG. 1 schematically illustrates a gas turbine engine 10. The engine 10 includes a compressor section 12 and a turbine section 14 interconnected by a shaft 16. A combustor 18 is arranged between the compressor and turbine sections 12/14. The turbine section 14 includes first and second turbines 20/22, which correspond to high and low pressure turbines, respectively. A generator 24 is rotationally driven by a shaft coupled to the low pressure turbine 22, or power turbine. The generator 24 provides electricity to a power grid 26. It should be understood that the illustrated engine 10 is highly schematic, and may vary from the configuration illustrated. Moreover, the examples herein are not limited to industrial turbines and may be used in propulsion gas turbine engines.

Figure 2:
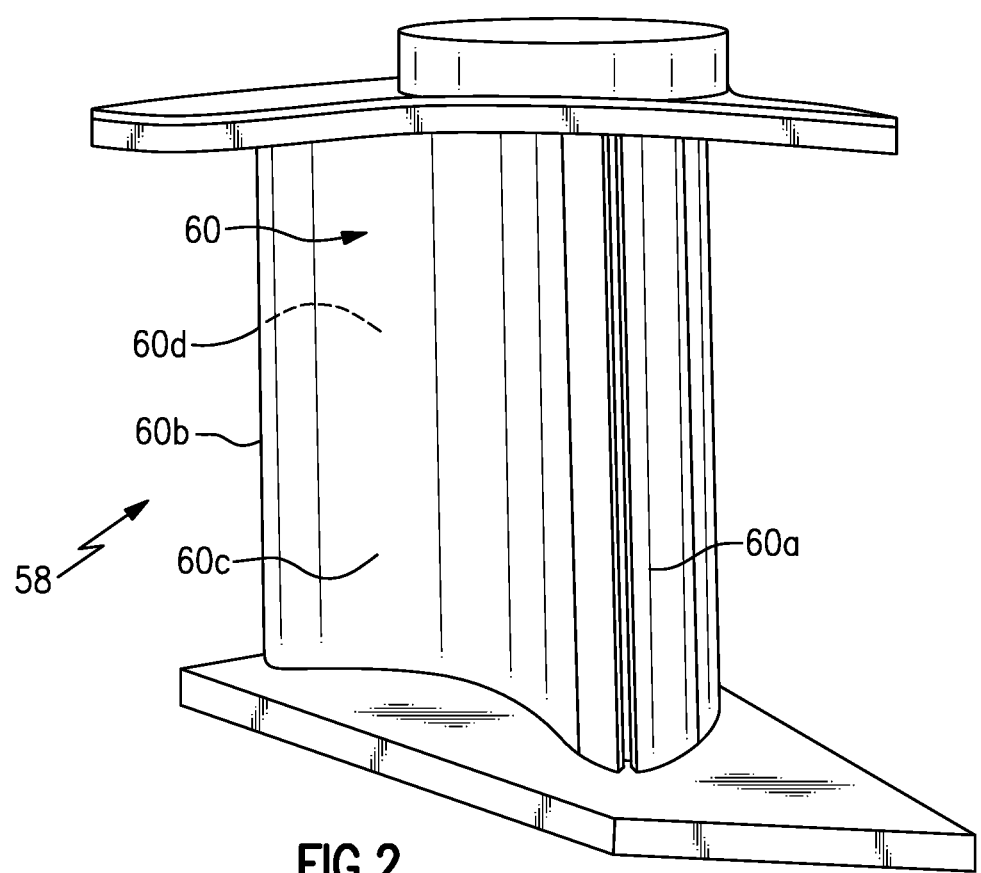
FIG. 2 illustrates a turbine airfoil.
Figure 3:
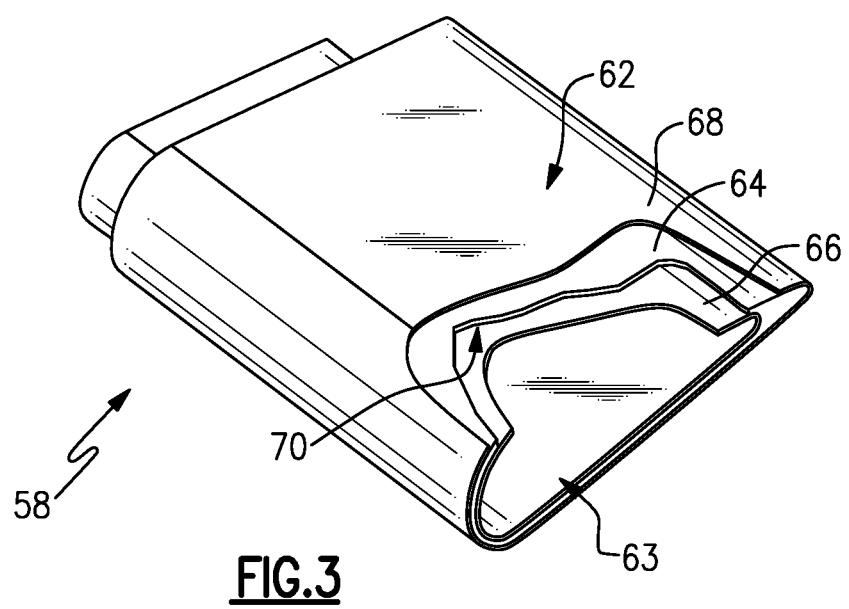
FIG. 3 illustrates a cutaway view of a portion of a turbine airfoil.

FIG. 2 illustrates an isolated view of an airfoil 58 that demonstrates several aspects of the present disclosure, and FIG. 3 illustrates a cutaway view of portions of the airfoil 58. As will be appreciated, the airfoil 58 is from the turbine section 14 of the engine 10. Although the airfoil 58 is depicted as a turbine vane that has radially inner and outer endwalls, it is to be understood that the airfoil 58 may alternatively be a blade. As used herein, directional terms such as "axial," "radial," and the like are taken with regard to the rotational axis of the engine 10, which is generally coaxial with the shaft 16.

The airfoil 58 is generally comprised of an airfoil section 60 that defines a leading edge 60a, a trailing edge 60b, a first or pressure side 60c, and a second or suction side 60d. The terminology "first" and "second" as used herein is to differentiate that there are two architecturally distinct components or features. It is to be further understood that the terms "first" and "second" are interchangeable in the embodiments herein in that a first component or feature could alternatively be termed as a second component or feature, and vice versa.

Referring to FIG. 3, the airfoil section 60 is formed of an airfoil wall 62 that surrounds a core cavity 63. In this example, the airfoil section 60 includes a single cavity, although multiple cavities that are divided by ribs or other structures are also contemplated. The core cavity 63 may be connected to a cooling air source, such as bleed air from the compressor 12, which provides relatively cool air into the core cavity 63 for cooling the airfoil 58.

The airfoil wall 62 includes a first wall section formed of a monolithic ceramic shell 64 (hereafter "shell 64"), a second wall section formed of a ceramic matrix composite liner 66 (hereafter "liner 66"), and a conformal, non-structural ceramic barrier coating 68. The liner 66 is bonded along an interface 70 to an interior side of the shell 64. The ceramic barrier coating 68 is bonded to an exterior side of the shell 64 and is thus exposed to the core gas flow through the engine 10. Generally the shell 64 is structural and facilitates providing good high temperature resistance and stability against oxidation, corrosion, and erosion (recession), and the liner 66 is also structural and facilitates providing good strength, impact resistance, and creep resistance.

The shell 64 may be, but is not limited to, silicon carbide (SiC), silicon nitride ($Si_3N_4$), alumina ($Al_2O_3$), silicon aluminum oxynitride (SiAlON), nitride bonded silicon carbide (NBSC), aluminum nitride (AlN), silicon oxynitride ($Si_2N_2O$), or other oxides, carbides, or nitrides, and particulate composites thereof. In some examples, the shell 64 has a thickness from about 2 millimeters to about 5 millimeters.

The ceramic matrix composite of the liner 66 includes bundles of fibers called tows in the form of yarns that are disposed in a ceramic matrix. The fibers within the CMC include fiber bundles woven into plies, like cloth, which are assembled into a fiber-reinforced preform which is later infiltrated with the ceramic matrix. Most typically, the fibers are ceramic fibers that are provided as a fiber network, such as woven plies, fibrous mats, and the like. The fibers may be, but are not limited to, non-oxide fibers such as SiC fibers or oxide fibers such as aluminosilicate fibers. The fibers may also be coated with boron nitride (BN) or other interface material to prevent bonding with the matrix.

The ceramic matrix of the liner 66 may be, but is not limited to, amorphous compounds of silicon, carbon, nitrogen, oxygen, boron, or other light elements. Example compounds include SiC, such as SiC formed by silicon melt-infiltration, chemical vapor deposition, polymer infiltration and pyrolysis, or variations or combinations of these processes, $Al_2O_3$, $Si_3N_4$, boron nitride (BN), SiAlON, AlN, magnesium aluminum silicate (MAS), lithium aluminum silicate, barium aluminum silicate (BAS), barium magnesium aluminum silicate (BMAS), glass-ceramics, and combinations thereof. Those skilled in the art will recognize that other matrices, including metalloids such as silicon or alloys thereof, could be employed. As mentioned, the liner 66 is bonded along an interface 70 to an interior side of the shell 64. For instance, the liner 66 and shell 64 become bonded during densification of the CMC of the liner 66. In one example, a fibrous pre-form is situated at the interior side of the shell 64. The ceramic matrix, or a precursor thereto, is then introduced into the fibrous pre-form, e.g., by vapor-infiltration, melt-infiltration, etc. At the surface of the fibrous preform, deposition of the matrix creates a strong bond with shell 64. For instance, the fibrous preform is infiltrated with elemental silicon and then carbon to chemically reactively convert the silicon to SiC. The silicon also reacts with the monolithic ceramic of the shell 64, particularly silicon-containing ceramics, thereby forming a strong chemical bond between the liner 66 and the shell 64.

The ceramic barrier coating 68 is a thermal and/or environmental barrier coating. Thermal barrier coatings are designed for maximizing thermal insulation from the surrounding high-temperature environment. Environmental barrier coatings are designed for maximizing resistance of infiltration or attack by environmental substances. For example, the ceramic barrier coating 68 includes yttria stabilized zirconia, gadolinia stabilized zirconia, hafnia, silica, barium-magnesium-aluminosilicate, and combinations thereof. The ceramic barrier coating may be of a single layer configuration or multi-layer configuration. For example, the ceramic barrier coating 68 has a thickness of about 0.5 millimeters to about 0.8 millimeters.

Figure 4:
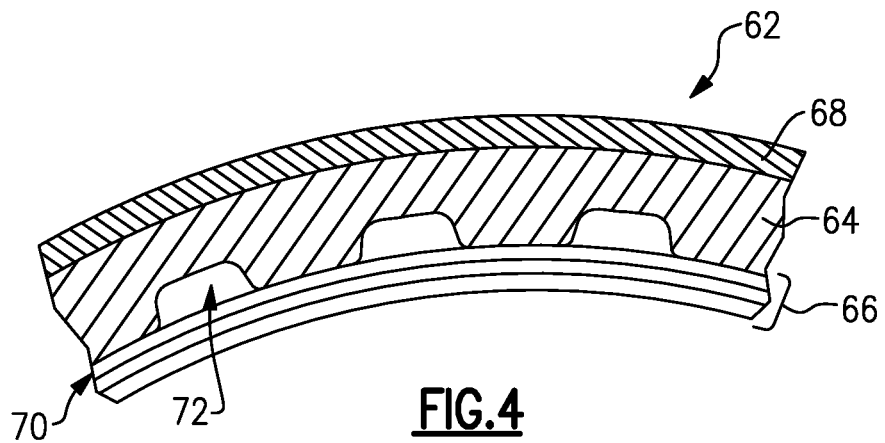
FIG. 4 illustrates inter-sectional cooling channels in an airfoil wall.

FIG. 4 illustrates a sectioned view through a representative portion of the airfoil wall 62. In this example, the airfoil wall 62 includes inter-section cooling channels 72 that extend along the interface 70. Depending on location on the airfoil 60, the channels 72 may be oriented, with respect to the engine axis A, radially, axially, or circumferentially, or have directional components in any of those directions. The channels 72 are bound by the shell 64 and the liner 66 As used herein the term "inter-section" refers to a channel that is bound about its periphery by two distinct sections formed of different materials, such as a monolithic ceramic and a CMC, as opposed to a channel that is bound entirely about its perimeter by a single section of the same material. In this example, the shell 64 is one section and the liner 66 is another section. As shown, the channels 72 have a generally U-shaped cross-section that is formed primarily by the shell 64, while the top of the "U" is bound by the liner 66. The cross-sectional shape may be varied but most typically will have a rounded profile so as to avoid low-radius re-entrant corners that can act as stress concentrators. For example, the cross-sectional shape may alternatively be, but is not limited to, circular (round) or partial-circular shapes. Additionally, the cross-sectional shape may be selected and varied to tailor cooling air flow and pressure drop.

Figure 5A:
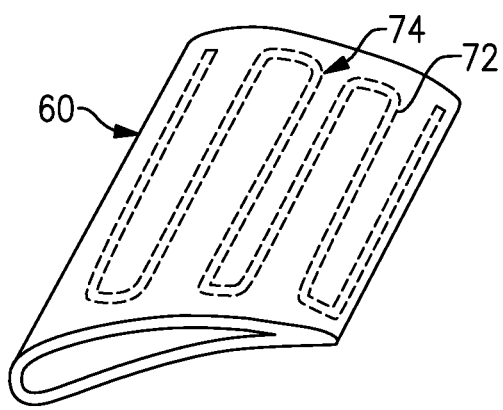
FIG. 5A illustrates a radial serpentine channel configuration.
Figure 5B:
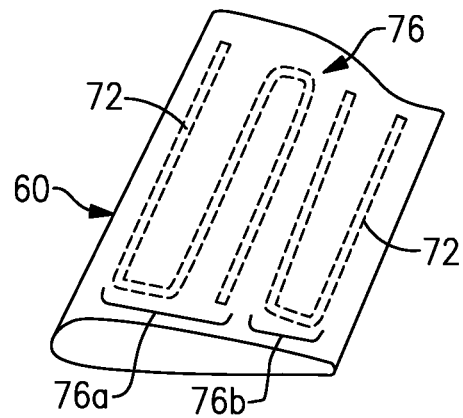
FIG. 5B illustrates a zonal channel configuration.
Figure 5C:
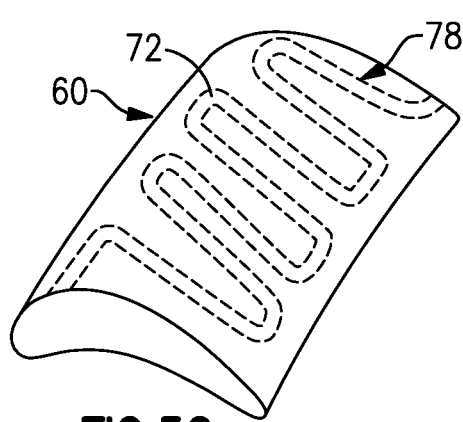
FIG. 5C illustrates an axial serpentine channel configuration.

In one example, the arrangement and spacing of the channels 72 are selected to transport the majority of the conduction heat flux as a thermal gradient across the shell 64 and to facilitate a uniform temperature profile across the CMC liner 66 under expected operating conditions. In this regard, the channels 72 may be provided in numerous serpentine and/or zonal configurations. For instance, as shown in FIG. 5A, the channels 72 are provided in a radial serpentine configuration 74 in which the channels 72 wind radially inwards and outwards. In another example as shown in FIG. 5B, the channels 72 are provided in a radial serpentine configuration 76 that has isolated zones 76a/76b. In another example shown in FIG. 5C, the channels 72 are provided in an axial serpentine configuration 78 in which the channels 72 wind axially forward and aft.

Figure 5D:
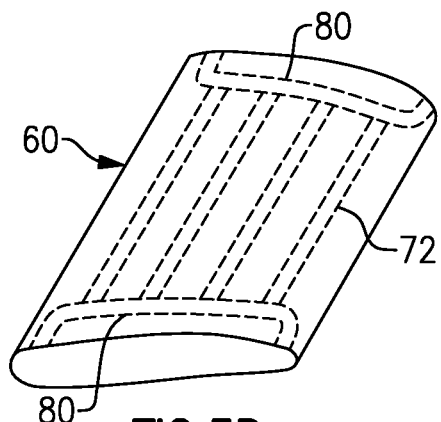
FIG. 5D illustrates a manifolded channel configuration.
Figure 5E:
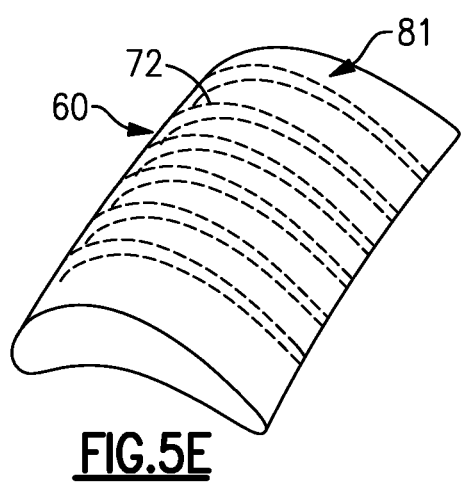
FIG. 5E illustrates an axial channel configuration.

In any of the above examples, the channels 72 may be end-fed with cooling air and/or cavity-fed though the core cavity 63 by feed orifices in the liner 66. In one additional example shown in FIG. 5D, the channels 72 generally extend in a radial direction and include manifolds 80. One of the manifolds 80 is a feed manifold and the other of the manifolds 80 is a discharge manifold. That is, one or more of the channels 72 may serve as a manifold or plenum for feeding multiple branch channels. In yet another example in FIG. 5E, the channels 72 generally extend in an axial direction and may be fed with cooling air and/or cavity-fed though the core cavity 63 by feed orifices in the liner 66. It is to be appreciated that the above configurations may be united in various combinations to provide further useful cooling arrangements.

The cooling air that flows through the channels 72 removes heat that is conducted into the shell 64 from the hot combustion gases in the core flow of the engine 10. Furthermore, having the channels 72 at the interface 70 and formed in part by the shell 64 facilitates thermal management efficiency. For example, the shell 64 has a first thermal conductivity and the liner 66 has a second thermal conductivity that is significantly lower than the first thermal conductivity. Thus, heat is more rapidly conducted through the shell 64 than the liner 66. By locating the channels 72 at the shell 64, a considerable portion of the incoming heat may be removed and relatively uniform temperatures may be maintained across the CMC plies 66. Furthermore, as the channels 72 are at the interface 70 with the liner 66, the liner 66 is also cooled. In this regard, the channels 72 can facilitate augmentation or replacement of the internal impingement cooling of the liner 66 inside the cavity 63. In comparison, if there were only cooling at the interior of the liner 66 in the cavity 63, heat would not be removed as rapidly since the liner 66 does not conduct heat as rapidly as the shell 64. As a result, a greater heat build-up and higher thermal gradients from exterior to interior would be expected, which may require additional film cooling at an efficiency penalty. The cooling channels reduces the temperature at the interface 70 between the shell 64 and the liner 66 thereby reducing the thermal stresses generated at the interface due to mismatch of the thermal expansion coefficients between the shell and liner that can lead to cracking and delamination. Furthermore, more uniform temperature of the CMC liner 66 reduces the thermal stress generated within it that can lead to delamination of the CMC plies.

Figure 6:
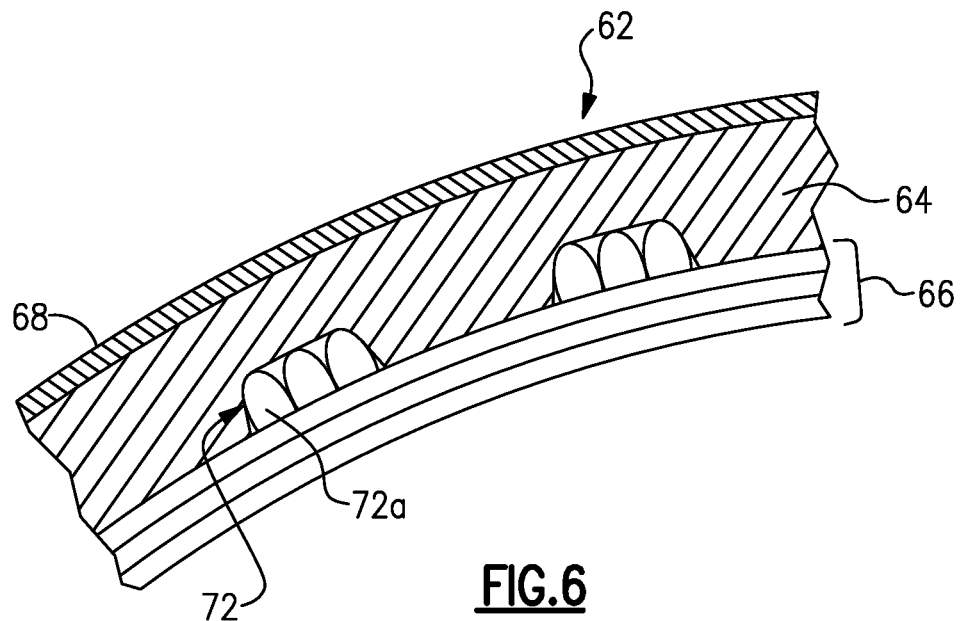
FIG. 6 illustrates channels that include flow guides.

In a further example shown in FIG. 6, the channels 72 include flow guides 72a. For instance, the flow guides 72a include one or more of pedestals, pins, flow guides or trip strips, which provide separate passageways, increased heat convection and additional surface area for thermal transfer. The flow guides 72a need not extend all the way to the interface 70; however, flow guides 72a that do extend to the interface 70 are bonded to the liner 66 and thus provide additional interfacial strength.

The cooling air that collects heat in the channels 72 is expelled from the airfoil 58 into the core gas flow. In some instances, where the cooling air has additional heat capacity, the cooling air may be used elsewhere for thermal management of other structures. Additionally or alternatively, the cooling air may be provided into the channels 72 after cooling another structure such that it has already picked up some heat. Most typically, however, the cooling air will be at a relatively high temperature after flowing through the channels 72 and will therefore be discharged into the core gas flow.

Figure 7:
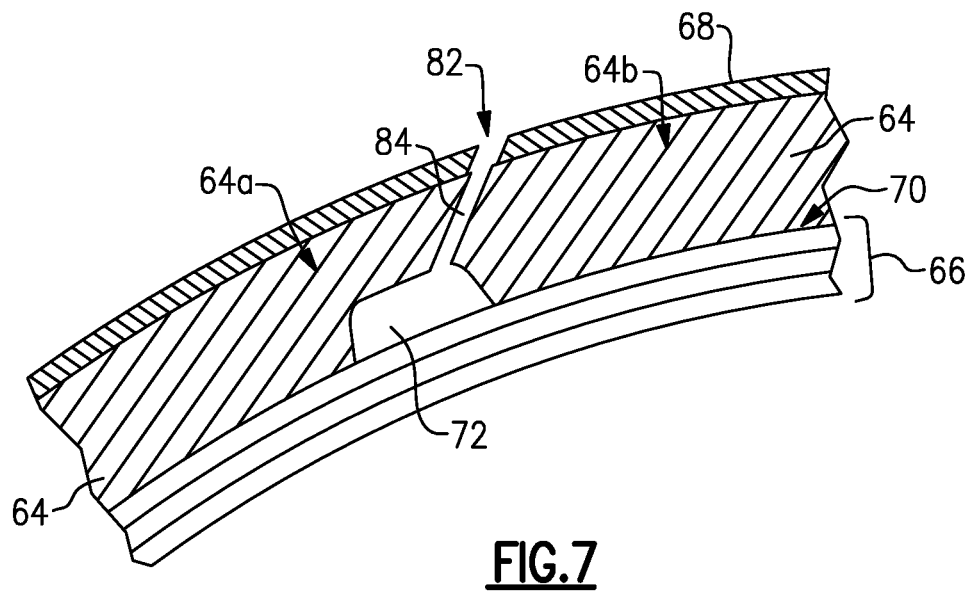
FIG. 7 illustrates a joint between two panels and an exit channel

In metallic airfoils, cooling air is discharged through orifices in the airfoil walls. In the shell 64, however, orifices in the shell 64 that open to the outer surface should be avoided because they can act as stress concentrators. Rather, the shell 64 in the example in FIG. 7 is provided in several panels and the cooling air is expelled through the joints between panels. For instance, the shell 64 is comprised of first and second panels 64a/64b that are both bonded to the liner 66. The panels 64a/64b meet at a joint 82, and the channel 72 opens to an exit channel 84 in the joint 82. As the liner 66 is continuous across the joint 82, there are no orifices or slots through the liner 66 at the joint 82. The exit channel 84 may be sloped relative to the local outer surface in order to discharge the air as a cooling film along the outer surface. Additionally, the joint 82 between the panels 64a/64b may facilitate stress relief between the panels 64a/64b. It is to be understood, however, that such panels and joints may be excluded in implementations where thermal stresses or concentrators are tolerable under the operating conditions. In another alternative where thermal stresses or concentrators are tolerable under the operating conditions, orifices in the shell 64 may be used.

Figure 8:
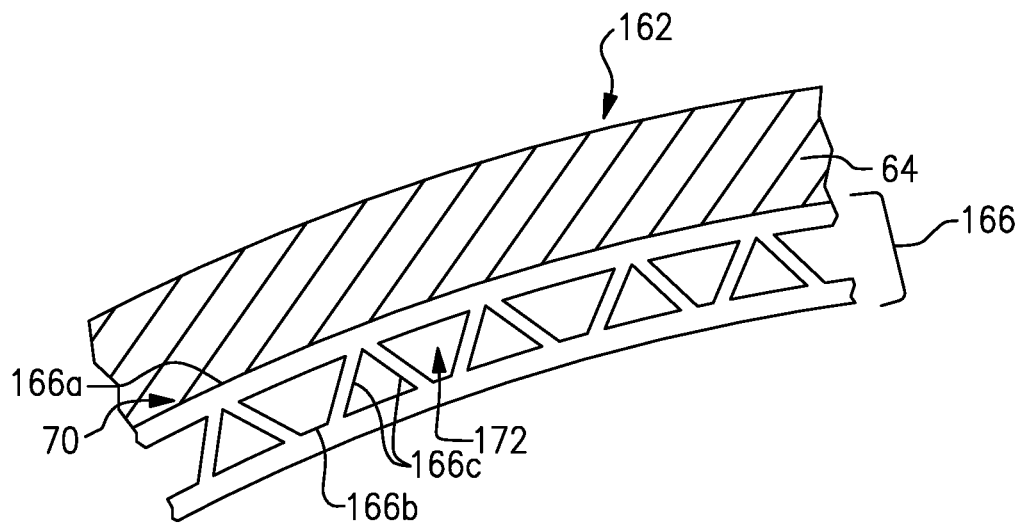
FIG. 8 illustrates intra-sectional cooling channels in an airfoil wall.
Figure 9:
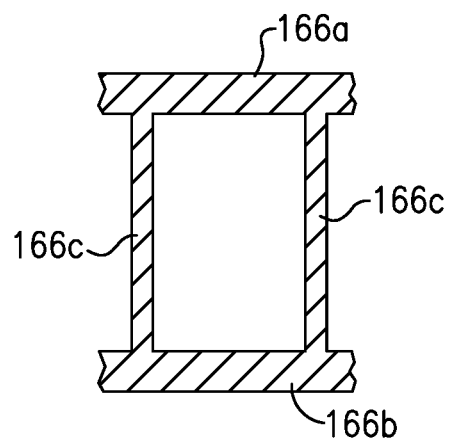
FIG. 9 illustrates a channel pattern.

FIG. 8 illustrates another example airfoil wall 162 that may be used in the airfoil 58 in place of, or in addition to, the airfoil wall 62. In this example, the CMC liner 166 includes first and second spaced-apart face layers 166a/166b and fibrous ligaments 166c that connect the face layers 166a/166b. In this regard, the CMC liner 166 is somewhat thicker than the CMC liner 66. For example, the CMC liner 166 may be from about 10 to 20 millimeters thick. Intra-section cooling channels 172 extend between the ligaments 166c. As used herein the term "intra-section" refers to a channel that is bound entirely around its perimeter by a single section of the same material, such as a CMC, as opposed to the inter-section channel as discussed above. In this example, the channels 172 are defined in the liner 166 of CMC and are not bound by the shell 64. In the illustrated example, the ligaments 166c are elongated walls (extending into the plane of the figure) such that the channels 172 are elongated. The face layers 166a/166b and the ligaments 166c are formed of CMC compositions as described above. The ligaments 166c form a cross-sectional pattern. For instance, in illustrated example, the channels 172 have a trapezoidal shape, but other cross-sectional patterns may also be used, such as but not limited to, circular (round) or partial-circular shapes. Circular and partial-circular shapes may facilitate reductions in stress concentrations and, therefore, higher differential pressure capability. In another example, the shown in FIG. 9, the ligaments 166c and face layers 166a/166b may form a rectangular pattern. The channels 172 may be configured in any the arrangements discussed above for the channels 72. In an additional example, the airfoil wall 58 includes both the channels 72 and the channels 172.

Additionally, the "truss-like" structure of the ligaments 166c and face layers 166a/166b facilitates higher specific stiffness and an efficient use of material to create a stiffer structure as compared to a constant thickness wall of equal amount of material. In further examples, at least a portion of the channels 172 are filled or partially filled with material with a low thermal conductivity material (relative to the woven CMC material), to facilitate passive insulation for a given through-thickness heat flux.

The fabrication of the liner 66/166 also is not particularly limited and may be produced using a fiber-reinforced preform and then infiltrating the preform with a ceramic matrix material or precursor to the ceramic matrix material. The infiltration may be conducted by any of a variety of methods, including but not limited to, chemical vapor infiltration (CVI), polymer infiltration and pyrolysis (PIP), transfer molding, and melt infiltration (MI). The shell 64 may be prefabricated using known ceramic processing techniques, such as slip casting, isostatic pressing and green machining, injection molding, or additive manufacturing, followed by densification. Densification techniques include, but are not limited to, sintering, hot isostatic pressing (HIP), sinter-HIPing, silicon infiltration and reaction bonding, and reaction bonding in combination with other techniques listed herein.

The preform for the liner 66/166 may be constructed in the desired geometry in the shell 64, in contact with the interior surfaces of the shell 64 at the interface 70. For example, fiber plies are built-up to construct the walls of the liner 66/166. Upon densification of the ceramic matrix of the liner 66/166, due to the contact between the preform and the monolithic ceramic of the shell 64, the ceramic matrix material strongly bonds with the monolithic ceramic. Such bonding facilitates mechanical strength in the airfoil 58 as well as heat transfer through joined interfaces between the shell 64 and the liner 66/166. Additionally, since the shell 64 and liner 66/166 are bonded together at high temperature during firing and curing, having multiple shell pieces can allow for relief of residual stresses generated during the manufacturing process.

Alternatively, the liner 66/166 may be prefabricated and densified prior to bonding with the shell 64 and then assembled into the shell 64. A brazing material, such as but not limited to elemental silicon, may be provided at the interfaces that are to be joined. Upon heating to an appropriate brazing temperature for the selected brazing material, the brazing material diffuses and bonds the shell 64 and liner 66/166 together.

The fabrication of the liner 166 may include three-dimensional weaving to form channels the channels 172 in the weft direction of the weave by virtue of warp yarns being used to connect the integrally woven face layers 166a/166b with the periodically spaced ligaments (walls) 166c. The ligaments 166c can be woven such that they are parallel or oriented at angles relative to the face layers 166a/166b. The face layers 166a/166b may be of 2-dimensional fiber weave or 2.5-dimensional fiber weave, such as plain weave, satin weave, angle interlock, or layer-to-layer interlock.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
   an airfoil section having an airfoil wall surrounding a cavity, the airfoil wall including first wall section comprised of a monolithic ceramic shell, a second wall section comprised of a ceramic matrix composite (CMC) liner bonded along an interface to an interior side of the monolithic ceramic shell, and a ceramic barrier coating bonded to an exterior side of the monolithic ceramic shell; and
   the airfoil wall including at least one of: inter-section cooling channels extending along the interface and being bounded by the monolithic ceramic shell and the CMC liner or intra-section cooling channels extending within the CMC liner.

2. The airfoil as recited in claim 1, wherein the monolithic ceramic shell has a first thermal conductivity and the CMC liner has a second thermal conductivity that is lower than the first thermal conductivity.

3. The airfoil as recited in claim 1, wherein the monolithic ceramic shell is selected from the group consisting of SiC, Si3N4, Al2O3, SiAlON, nitrogen-bonded SIC, and AlN, and the CMC liner is SiC fiber/SiC matrix.

4. The airfoil as recited in claim 1, wherein the airfoil wall includes the inter-section cooling channels.

5. The airfoil as recited in claim 4, wherein the inter-section cooling channels are in a serpentine arrangement.

6. The airfoil as recited in claim 4, wherein the inter-section cooling channels include flow guides and heat transfer enhancements.

7. The airfoil as recited in claim 4, wherein the monolithic shell is comprised of first and second panels bonded along the interface with the CMC liner, the first and second panels meet at a joint, and the inter-section cooling channels open to an exit channel in the joint.

8. The airfoil as recited in claim 1, wherein the airfoil wall includes the intra-section cooling channels.

9. The airfoil as recited in claim 8, wherein the CMC liner includes first and second spaced-apart face layers, fibrous ligaments connecting the first and second spaced-apart face layers, and the intra-section cooling channels extend between the fibrous ligaments.

10. The airfoil as recited in claim 9, wherein the fibrous ligaments form a pattern.

11. The airfoil as recited in claim 9, wherein the intra-section cooling channels have a trapezoidal cross-section.

12. The airfoil as recited in claim 9, wherein the monolithic shell is comprised of first and second panels bonded along the interface with the CMC liner, the first and second panels meet at a joint, and the intra-section cooling channels open to an exit channel in the joint.

13. An airfoil comprising:
an airfoil section having an airfoil wall surrounding a cavity, the airfoil wall including first wall section comprised of a monolithic ceramic shell, a second wall section comprised of a ceramic matrix composite (CMC) liner bonded along an interface to an interior side of the monolithic ceramic shell, and a ceramic barrier coating bonded to an exterior side of the monolithic ceramic shell, wherein the monolithic ceramic shell has a first thermal conductivity and the CMC liner has a second thermal conductivity that is lower than the first thermal conductivity; and cooling channels extending along the interface and being bounded by the monolithic ceramic shell and the CMC liner.

14. The airfoil as recited in claim 13, wherein the monolithic shell is comprised of first and second panels bonded along the interface with the CMC liner, the first and second panels meet at a joint, and the cooling channels open to an exit channel in the joint.

15. The airfoil as recited in claim 14, wherein the monolithic ceramic shell is selected from the group consisting of SiC, Si3N4, Al2O3, SiAlON, nitrogen-bonded SIC, and AlN, and the CMC liner is SiC fiber/SiC matrix.

16. A gas turbine engine comprising:
a compressor section;
a combustor in fluid communication with the compressor section; and
a turbine section in fluid communication with the combustor,
the turbine section having an airfoil that includes
an airfoil section having an airfoil wall surrounding a cavity, the airfoil wall including first wall section comprised of a monolithic ceramic shell, a second wall section comprised of a ceramic matrix composite (CMC) liner bonded along an interface to an interior side of the monolithic ceramic shell, and a ceramic barrier coating bonded to an exterior side of the monolithic ceramic shell, and
the airfoil wall including at least one of: inter-section cooling channels extending along the interface and being bounded by the monolithic ceramic shell and the CMC liner or intra-section cooling channels extending within the CMC liner.

17. The gas turbine engine as recited in claim 16, wherein the monolithic ceramic shell has a first thermal conductivity and the CMC liner has a second thermal conductivity that is lower than the first thermal conductivity.

18. The gas turbine engine as recited in claim 17, wherein the airfoil wall includes the inter-section cooling channels, the monolithic shell is comprised of first and second panels bonded along the interface with the CMC liner, the first and second panels meet at a joint, and the inter-section channels open to an exit channel in the joint.

19. The gas turbine engine as recited in claim 17, wherein the airfoil wall includes the intra-section cooling channels, the CMC liner includes first and second spaced-apart face layers and fibrous ligaments connecting the first and second spaced-apart face layers, the intra-section channels extend between the fibrous ligaments, the monolithic shell is comprised of first and second panels bonded along the interface with the CMC liner, the first and second panels meet at a joint, and the intra-section channels open to an exit channel in the joint.

* * * * *